3,217,777
TRACTION MEANS
Harold E. Kimes, 1018 W. Douglas St., Freeport, Ill.
Filed June 22, 1964, Ser. No. 376,948
8 Claims. (Cl. 152—211)

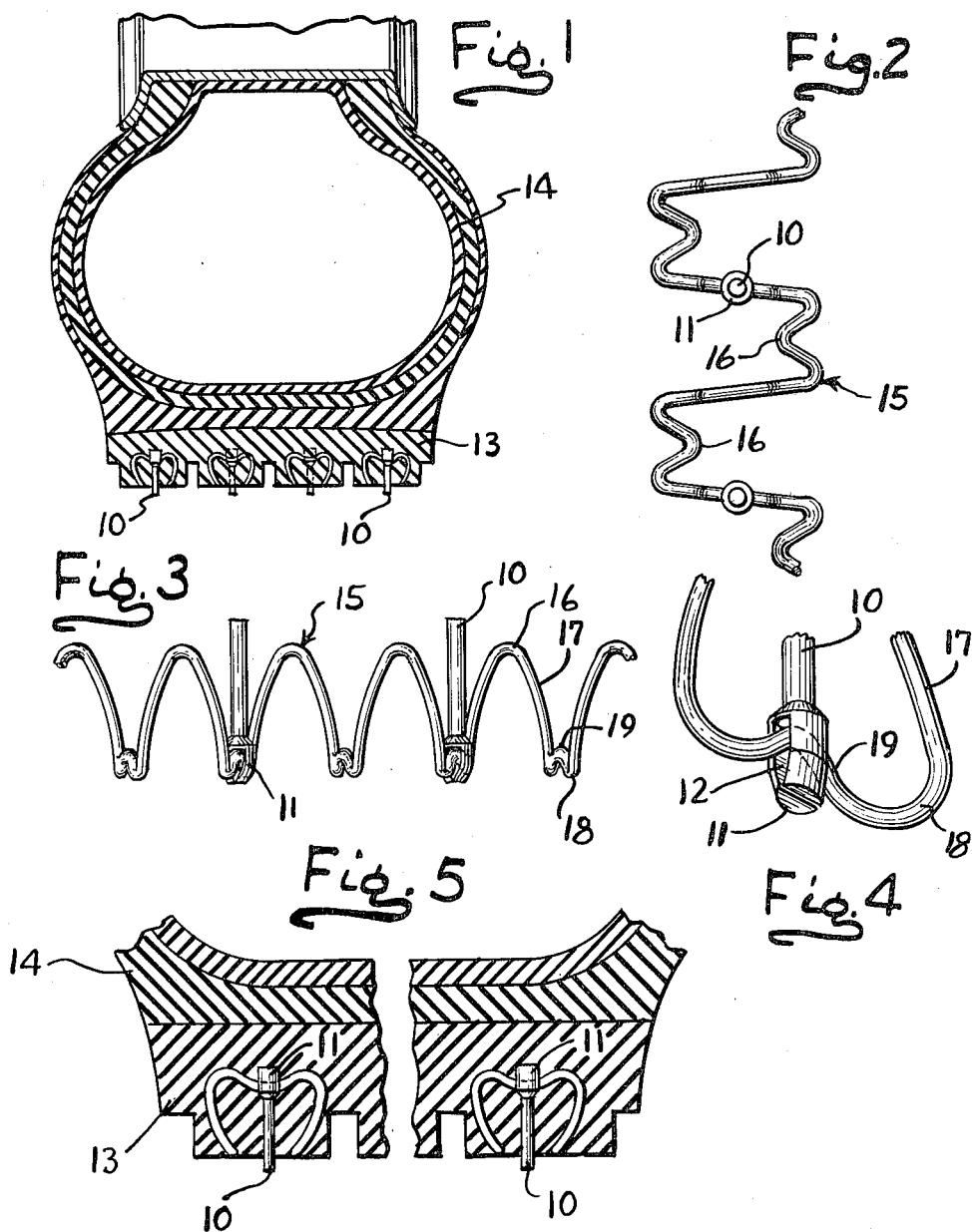

This invention relates to novel traction means and more particularly to new and improved anti-skid means for pneumatic tires.

More specifically, the present invention relates to the provision of novel spikes or teeth adapted to be disposed radially of the tread of a pneumatic tire in desirable spacing circumferentially or longitudinally of the tread, and to a pneumatic tire embodying the same.

The present invention further relates to the novel combination and interengagement of the aforesaid teeth with flexible and elongatable wire means, adapted to be embedded in the tire tread in a circumferential or longitudinal direction thereof, and which wire may also act as anti-skid means.

The present invention further relates to novel means on said anti-skid teeth whereby they can be firmly and securely engaged to non-linear portions of said wire and thereby caused to be retained against displacement from radial disposition in the tire tread as aforesaid.

Other objects and advantages of the present invention, its details of construction and arrangement of parts will be apparent from a consideration of the following specification and accompanying drawings, wherein:

FIG. 1 is a transverse section of a pneumatic tire embodying the present invention.

FIG. 2 is a plan view of an elongatable flexible metallic wire insert for a pneumatic tire tread having secured thereto anti-friction spikes or teeth in accordance with the present invention, and FIG. 3 is a side elevational view of the arrangement shown in FIG. 2.

FIG. 4 is a perspective view of one of my anti-skid teeth in engagement with a supporting wire component.

FIG. 5 is a view similar to that of FIG. 1 in fragmentary relatively enlarged form.

Referring to the drawings, the reference numeral 10 designates one of the anti-skid teeth of the present invention. These teeth include a substantially cylindrical elongated blunt-ended portion adapted to extend to or outwardly of a tire tread portion 13, and a relatively widened or greater diameter base portion 11 which is longitudinally slotted so as to form an endwise open slot 12. As previously indicated, these teeth 10 are adapted to be disposed within a tread portion 13 of a pneumatic tire 14 and to extend therein in a radial direction. They extend to adjacent the surface of tread 13, that is, to said surface or slightly above or slightly below it, in the latter case disposition within the tread being such that the tips of the teeth will be caused to project to the surface of tread 13 on use and flexing, as is normal to the pneumatic tire.

For the purpose of supporting the teeth 10 both in a radial direction and circumferentially of the tread, I provide a metallic flexible and elongatable metallic coiled wire generally indicated as 15 which optionally, and in the preferred embodiment of my illustrated invention, also acts as an anti-skid device, and is adapted to be embedded in the tread of the tire as shown. This wire 15, instead of being in continuous helical or coil form as can be the case in a non-fully equivalent, non-illustrated form, is repeatedly return bent as at 16 to provide a plurality of components defining curved or arcuate arms 17 and curved base portions 18, the latter being provided with a reentrant portion 19.

The bends 16 of wire 15, when disposed adjacent to the surface of tire tread 13 are adapted to become abraded and to result in separated and pointed anti-skid portions as more fully described and claimed in my United States Patent No. 2,600,506 and others. Although desirable as an anti-skid adjuvant in the present invention, in a non-fully equivalent, non-illustrated form, the wire coil 15 may be embedded in tread 13 a sufficient depth so that the tips 16 do not become abraded and separated. In such instance the wire 15 still serves as a positioning or spacing means for the teeth 10 during tire molding or retreading, as a means for providing an anchor for the teeth, and for transferring and dissipating frictionally generated heat throughout the tire body from said teeth.

Thus the teeth 10 are adapted to be engaged to some of the turns or components of the coiled wire 15 by engaging their slotted base portions 11 over a non-linear, i.e. curvilinear, portion of the wire, and in the illustrated form over the reentrant portion 19, followed by swaging or clamping the ends of the slotted portion together to firmly grip wire 15, it being understood that the transverse direction of the slot is such as to fairly firmly grip the wire, and the width of the slot is such as to embrace an appreciable length of wire 15 over a non-linear or curvilinear portion so that the tooth 10 becomes non-rotatable relative to wire 15. The tooth 10 thus becomes disposed between the arms of a turn of wire 15 and each is retained in the plane of the wire component formed by a pair of arms. The wire 15 being in coil form can readily flex and stretch with the pneumatic tire as it is flexed in use, without tendency to break, as in the case of a straight wire, and thus aids in retaining the teeth 10 in desired useful position.

Although I have shown and described the preferred embodiment of my invention, it will be understood by those skilled in the art that changes may be made in the details thereof without departing from its scope as comprehended by the following claims.

I claim:

1. A metallic anti-skid insert for pneumatic tires comprising a tooth adapted to be embedded in the tread of a tire and to extend radially thereof, said tooth including a longitudinally slotted endwise open base portion adapted for reception of and interlocking embracing engagement with a non-linear portion of a flexible metallic wire adapted to be embedded therewith in the tread of said tire, and an opposed substantially cylindrical blunt-ended portion adapted to project outwardly of the tire tread.

2. A metallic anti-skid insert for pneumatic tires comprising a flexible and elongatable wire component adapted to be embedded in the tread of a tire and to be disposed circumferentially thereof and a plurality of anti-skid tooth components disposed longitudinally of said wire and adapted to extend radially of said tread, said tooth component including an elongated substantially cylindrical portion adapted to extend to the tread of the tire and an opposed longitudinally slotted base portion in interlocking embracing engagement with non-linear portions of said wire.

3. A metallic anti-skid insert for pneumatic tire treads comprising a flexible and elongatable connected chain of wire anti-skid components adapted to be embedded in the tread of a tire and to be disposed circumferentially thereof, and a plurality of anti-skid tooth components disposed longitudinally of the chain and adapted to extend radially of said tread, said tooth components including an elongated substantially cylindrical portion adapted to extend to the tread of the tire and an opposed longitudinally slotted base portion in interlocking embracing engagement with non-linear portions of some of said wire components.

4. A metallic anti-skid insert for pneumatic tire treads comprising a flexible and elongated connected chain of curved wire anti-skid components adapted to be embedded in the tread of a tire with the plane of said components generally normal to the surface of the tire and to be disposed circumferentially thereof, and a plurality of anti-skid tooth components disposed in a regularly spaced aligned series longitudinally of the chain and adapted to extend radially of said tread, said tooth components including an elongated substantially cylindrical portion adapted to extend to the tread of the tire and an opposed longitudinally slotted base portion in interlocking relatively non-rotatable embracing engagement with portions of some of said wire components.

5. A metallic anti-skid insert for pneumatic tires comprising a flexible connected chain of curved wire components adapted to be embedded in the tread of a tire with the plane of said components generally normal to the surface of the tire, said components defining a curvilinear base and a pair of curvilinear arms projecting from said base, and a tooth component disposed between some of said arms and adapted to extend radially of said tread, said tooth including an endwise slotted base portion in interlocked embracing engagement with said curvilinear base wire portion and retained thereby against displacement from the plane of said engaged wire component.

6. A metallic anti-skid insert for pneumatic tires comprising a connected flexible chain of substantially U-shaped components adapted to be embedded in the tread of a tire with their planes generally normal to the surface of the tire, said U-shaped components having a curvilinear base and a pair of curvilinear arms projecting from said base, the medial portion of said base projecting reentrantly between said arms and a tooth component disposed between said arms, said tooth including a slotted base portion in interlocked embracing engagement with said reentrantly projecting base portion and retained thereby against displacement from the plane of said U-shaped component.

7. In a pneumatic tire, a metallic anti-skid insert comprising a tooth embedded in the tread of said tire and extending radially thereof, said tooth including a longitudinally slotted endwise open base portion receiving and in interlocking embracing engagement with a non-linear portion of a flexible elongatable metallic wire embedded in the tread of said tire.

8. In a pneumatic tire, a metallic anti-skid insert comprising a flexible, elongatable connected chain of wire anti-skid components embedded in the tread of the tire and disposed circumferentially thereof, and a plurality of anti-skid tooth components disposed longitudinally of said chain and extending radially of said tread, said tooth components each including a longitudinally slotted base portion in interlocking embracing engagement with a non-linear portion of said wire components.

References Cited by the Examiner
UNITED STATES PATENTS

| | | | |
|---|---|---|---|
| 536,488 | 3/1859 | Suter | 339—267 X |
| 1,760,035 | 5/1930 | Bedard | 339—276 X |
| 3,003,534 | 10/1961 | Cousins | 152—211 |
| 3,120,863 | 2/1964 | Coate | 152—210 |

ARTHUR L. LA POINT, *Primary Examiner.*